Nov. 9, 1965 G. MERZ 3,217,143

COUNTING CIRCUIT

Filed March 15, 1962 3 Sheets-Sheet 1

INVENTOR.

G. MERZ

BY Paul W. Hemminger

ATTORNEY

Nov. 9, 1965 G. MERZ 3,217,143
COUNTING CIRCUIT
Filed March 15, 1962 3 Sheets-Sheet 2

INVENTOR.
G. MERZ
BY Paul W. Hemminger
ATTORNEY

Nov. 9, 1965 G. MERZ 3,217,143

COUNTING CIRCUIT

Filed March 15, 1962 3 Sheets-Sheet 3

INVENTOR.
G. MERZ
BY Paul W. Hemminger
ATTORNEY 3,217,143

COUNTING CIRCUIT

Gerhard Merz, Rommelshausen, Wurttemberg, Germany, assignor to International Standard Electric Corporation, New York, N.Y., a corporation of Delaware Filed Mar. 15, 1962, Ser. No. 179,883
Claims priority, application Germany, Mar. 25, 1961, St 17,625
2 Claims. (Cl. 235—92)

The present invention relates to pulse responsive circuits and particularly to a special type of counting circuit. In the communications or data-processing art counting circuits are required for the counting of pulses. Normally, a certain potential is applied to the counter input during the normal (quiescent) condition, and during an impulse this potential is either increased or reduced by a predetermined amount depending on the type of circuit arrangement employed. The normal condition of the input line is appropriately assigned the state (condition) "0," whereas the state during the impulse is characterised by the letter "L," i.e. by the binary "one." In some cases the counter is provided with a separate control input, to which a pulse is applied if the counter is supposed to be reset to its zero or normal condition.

When considering the case that a counter is in a certain counting position Y, then this counter must have reached the counting position $Y+1$ after the first pulse. The counting position is characterised by the fact that the counter, via several outputs, and in accordance with the counted value and the selected code, performs a marking into "0" or "L" respectively. Each counter has a limited number of counting positions. The first one of these positions is known as the normal position, and the last one as the final position. Depending on the kind of practical application, the counter may be designed to be reset, by a pulse on the input line (cyclical counter), or else upon reaching the end position, the counter will remain in this position irrespectively of further pulses on the input line. In this case the counter is reset, via a separate second input, to its normal or starting position. By a series connection of counters with X, Y, Z counting positions it is possible to obtain a counting circuit comprising $X \cdot Y \cdot Z$ counting positions. This arrangement is then known as a counter chain or chain of counting circuits.

For technically realizing counting circuits various types of circuit varieties are used. However, all the varieties comprise counting circuits with a dynamic coupling. That is duration of the intermediate position when changing over from one counting position to the next one, is limited with respect to time. The cause of this time limit is that for the purpose of storing the intermediate position, there are used energy storage devices (mostly capactive storage devices) with a short storage time. Thus, the necessity of prescribing a certain maximum value for the duration of one counting pulse. This, requires pulse-shaper circuits arranged at the input, which are mostly designed as differentiating stages.

It is one object of the present invention to design a counting circuit without energy storage devices, in which no such time requirements are demanded from the input pulses. Since the inventive counting circuits do without energy storages, any spurious voltage pulses, for example, via the supply voltage, are also not transferred to other sensitive parts or points of the circuit. This results in a counting circuit featuring a high operating reliability. The counting circuit according to the invention is characterised by the fact that the pulses to be counted are adapted to control a static translator (permament memory) which is tuned (adapted) to both the counting rate and the counting program, and whose outputs are fed back to the inputs. That is, translator, is controlled in such a way that respectively at the beginning and the end of a pulse, at least one of the outputs of the translator changes its state "0" or "L," and that the new output information which is fed to the inputs via the feedback path, is changed via the translator until the output information is in agreement with the input information of the translator.

The control of the translator, in accordance with a further embodiment of the counting circuit, is effected together with the application and the removal of the counting pulse, i.e. directly and/or via an inverter stage. According to the invention the outputs of the translator may also be led back to the inputs of the translator via storage devices. This is particularly advisable in cases where the translator only comprises passive elements. The output signal of the translator, via an amplifier, may be directly applied to the corresponding input of the translator and, in addition thereto, may be led back via an inverter stage to the associated complementary input. This arrangement bears the advantage that the translator only needs to be designed as if it had one output signal because the associated complementary signal may be obtained in a more simple way by means of the subsequently arranged inverter stage. As with counting arrangements of the usual dynamic type, the counter according to the invention may be a cyclical counter. Or the counter may be arranged so that it is no longer stepped on after having reached the final position. In the latter case the final position is indicated by a special output signal, and the counter is only reset to normal again by the application of a pulse to a special input. According to the invention the fedback translator circuit, in the case of a counting rate of $n$, has always $2n$ stable positions. In this way the counter becomes independent of the duration of the counting pulse, because the counter, during the counting pulse, assumes a stable intermediate position, and is only transferred to the next counting position upon termination of the counting pulse. The translator of the counting arrangement should be preferably composed of semiconductors and resistors.

The counting circuit according to the invention will now be explained in detail with reference to FIGS. 1–5 of the accompanying drawings, in which.

Figure 1:
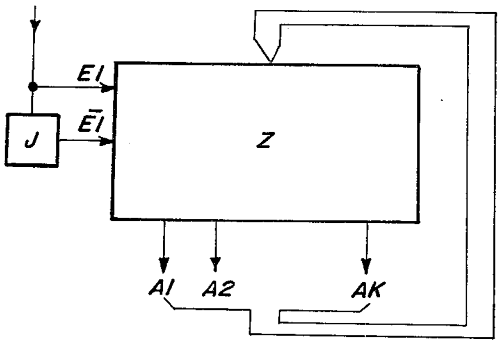
FIG. 1 shows the counting circuit according to the invention on principle.

FIG. 1 shows a translator Z comprising several outputs A1 . . . A$k$. These outputs are in direct communication with the inputs. The pulse to be counted is applied directly via the input E1, and as a complementary pulse, via an inverter stage J, to the input $\overline{E1}$. The control of the translator by these two inputs, and the feedback of the outputs A1 . . . A$k$ to certain inputs, is a function of the counting program of the counting circuit. This will still be described in detail hereinafter with reference to the embodiment. This basic circuit arrangement of FIGURE 1 presupposes that the translator comprises active elements, so that the feedback factor may become ≧1. In principle, such an arrangement performs its counting as follows: The pulses to be counted act via the translator, so that with the beginning or the end of a pulse at least one of the outputs A1 . . . A$k$ changes its state "0" or "L" respectively. The newly formed output information is fed as a new input information to the translator which, thereupon, performs the corresponding predetermined assignment (translation). On account of this there is provided a new output information which is again applied to the input of the translator, and thus causes a new assignment (translation). This cycle is repeated until the translator circuit assumes a stable condition, that is, until the output information is in agreement with the input information. If with respect to the counting circuit, there is desired a counting rate of $n$, then the translator circuit is designed to be capable of assuming $2n$ stable conditions. Then, with the application of the counting pulse (E1→"L," $\overline{E1}$→"0") and with the removal (E1→"0," $\overline{E1}$→"L") there is each time caused a stepping-on of the counter in the described manner.

Figure 2:
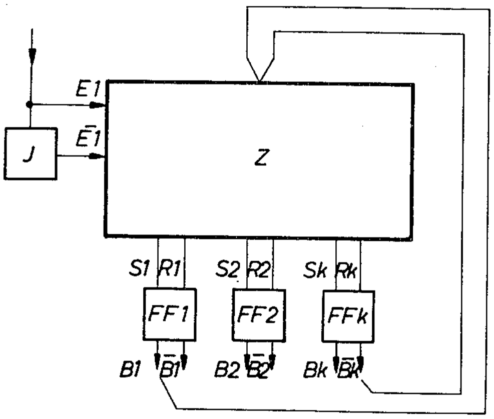
FIGS. 2 and 3 show modified types of counting circuits.

As may be recognized from FIG. 2, the information, that is, the counting position, may also be retained with the aid of flip-flop stages or trigger circuits which are connected to the outputs of a static translator comprising passive elements. From the fact that the state "0" at the inputs S and R of the flip-flop stage has no influence upon the condition thereof, whereas the state "L" at the input S causes the circuit to be brought to the state "L," and retains it in this state, and that in the case of the input R the same also applies to the state "0" of the circuit, there may be derived the logic conditions for the translator. Both of the inputs R and S may never be simultaneously in the same state "L." With respect to each trigger circuit the translator must comprise two outputs R and S, and the following must be applicable: The input S must assume the state "L" whenever the flip-flop stage is supposed to be brought to the state "L," and may be in the state "L" as long as the trigger circuit is supposed to remain in the state "L." The input R must be changed to the state "L" whenever the trigger circuit is supposed to be brought into the state "0," and may remain in the state "L" as long as the trigger circuit is supposed to remain in the state "0." From these conditions there may be set up the logical functions for the translator, and the design or construction of the translator may be derived therefrom, as will be shown hereinafter with reference to the example of embodiment in FIG. 4. The assignment (translation) is chosen in this example in such a way that subsequent to the reaching of the final position the counter returns to its normal or starting position during the next counting pulse (cyclical counter).

Figure 3:
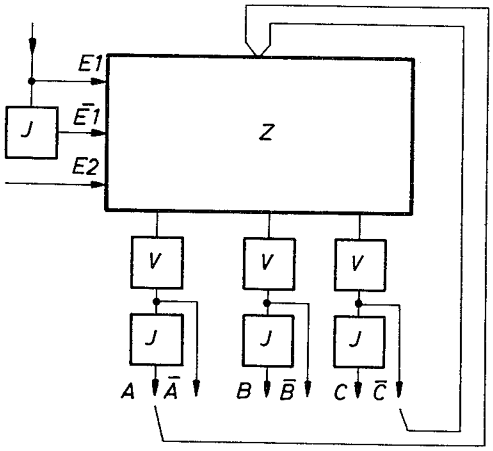

FIG. 3 shows a modification of the counting principle according to the invention. Depending on the desired output code of the counting position, such as either binary or "2-out-of-5," it may be of advantage with respect to the translator circuit, if the output signal of the translator is fed back via an amplifier V either directly to an input, or else, via both an amplifier and an inverter stage, in a complementary fashion to an associated second input. As is further shown, the assignment or translation may also be chosen thus that the counter, upon reaching its final position, will remain in this position until being set to normal by a separate control pulse applied to a separate input E2. This counting principle will be described in detail hereinafter in the course of describing the embodiment shown in FIG. 5.

Figure 4:
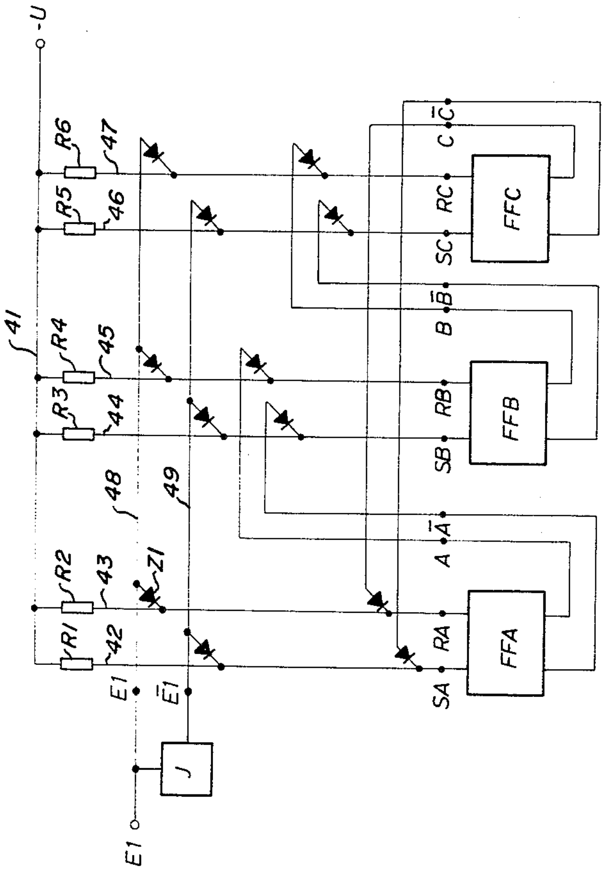
FIGS. 4 and 5 show embodiments of a counter with $n=3$ according to the principles of FIGS. 2 and 3.

FIG. 4 shows an embodiment of a cyclical type of counter comprising $n=3$ counting positions, based on the principle of the invention. As mentioned hereinbefore, the translator circuit, in this particular case, must comprise $2n=6$ stable conditions.

Besides the translator circuit, the counting arrangement comprises 3 flip-flop stages FFA, FFB and FFC, the outputs of the flip-flop stages act upon the translator inputs A, B, C, as well as upon the complementary translator inputs A, B and C of the translator. The counting circuit can have the counting and intermediate positions as listed Table I hereinafter.

*Table I*

| | FFA | FFB | FFC |
|---|---|---|---|
| Counting Position 1 | L | L | 0 |
| Counting Position 2 | L | 0 | L |
| Counting Position 3 | 0 | L | L |
| Intermediate Position 1 | L | 0 | 0 |
| Intermediate Position 2 | 0 | 0 | L |
| Intermediate Position 3 | 0 | L | 0 |

In Table I when the flip-flop stage FFA is shown in the state "L" it means that the output A of the flip-flop stage receives the voltage —U, and the output $\overline{A}$ the voltage ±0, and when the flip-flop stage FFA is shown in the state "0" it means that the voltage conditions are reversed, the output A is at ±0 voltage and $\overline{A}$ is at —U voltage. The output voltages A . . . C and $\overline{A}$ . . . $\overline{C}$ also correspond to the input voltages applied to the inputs of the translator provided with the same designations, A . . . C and $\overline{A}$ . . . $\overline{C}$.

The individual steps or sequences of the counting process may be shown in a simple way with the aid of the following Table II.

*Table II*

| Line | FF | E1="0" | E1="L" |
|---|---|---|---|
| 0 | A B C | | |
| 1 | 0 0 0 | | |
| 2 | 0 0 L | 0 L L | (2) 0 0 L |
| 3 | 0 L 0 | L L 0 | (3) 0 L 0 |
| 4 | 0 L L | (3) 0 L L | 0 L 0 |
| 5 | L 0 0 | L 0 L | (1) L 0 0 |
| 6 | L 0 L | (2) L 0 L | 0 0 L |
| 7 | L L 0 | (1) L L 0 | L 0 0 |
| 8 | L L L | | |

The left-hand column and the top line of the table contain all possible translator input information. From the remaining two columns, and in the close of a certain input information of the translator, there may be read the corresponding output information. For example, if the input E1 is in the state "0," and the feedback information 0LL is applied, then the information 0LL will appear at the output of the translator (see column 2 line 4). Since this information is again fed back to the inputs, and is in agreement with the input information, this position of the counting circuit is stable. If now a pulse appears at the input E1, then this input E1 will assume the state "L." Via the translator, there is formed a new output information 0L0. This information is fed back to the inputs of the translator and, as may be taken from line 3 of the table with respect to the input information 0L0, will produce the same output information 0L0. In this case there is again achieved a stable condition of the counting circuit. The stable counting intermediate positions are characterised in the Table II by the addition of numerals in parentheses. The input information of the translator, where input E1 is in the "0" state is identical to the counting position and, in the case of a state "L" of the input E1, is identical to the intermediate position. Further, as may be taken from the Table II, each counting position, when changing from $\overline{E1}$ to E1, has to be brought to a stable intermediate position, and from the stable intermediate position, when changing from E1 to $\overline{E1}$, to the respective successively following counting position. In this connection care has to be taken that no line of the table is utilized twice, because otherwise the unambiguity of the circuit arrangement is no longer safeguarded.

The stable intermediate positions can be fundamentally selected at will, and are likewise characterised in that both the input information and the output information of the translator are equal, but this time in the state "L" of the input line E1.

A control or marking potential is applied through common bus 41 to a bank of six resistors R1–R6. The other sides of the resistors R1–R6 are respectively connected through conductors 42–47 to outputs SA, RA, SB, RB, SC, and RC of the translator. The inputs to the translator are connected to the conductors through isolating diodes. For example, input E1 is connected to conductor 43 through diode Z1. When the input to a conductor is in state "L," the marking potential —U is passed through the conductor. When the input to a conductor is "0" the potential + or —0 is passed through the conductor instead of the marking potential.

Based on the above mentioned counting and intermediate positions the following logical functions with respect to the translator will result from the table:

$$SA=\overline{C}\cdot\overline{E1} \qquad SB=\overline{A}\cdot\overline{E1} \qquad SC=\overline{B}\cdot\overline{E1}$$
$$RA=C\cdot E1 \qquad RB=A\cdot E1 \qquad RC=B\cdot E1$$

The logical function $SA=\overline{C}\cdot\overline{E1}$ indicates that the output SA of the translator is marked by the potential —U in cases where no pulse is applied ($\overline{E}$="L"), and that the output $\overline{C}$ is marked, that is, the flip-flop stage FFC is in the state "0." The output RA, however, is marked if the pulse is applied ($E1$—"L"), and if the flip-flop stage FFC is in the state "L" (C marked, $\overline{C}$ not marked).

When assuming that the counter is in the counting position (2), then the flip-flop stages FFA and FFC are in the state "L," that is, to the input A and C of the translator there is applied the marking potential —U. The inputs $\overline{A}$, $\overline{C}$ have plus or minus 0 potential. Accordingly, output SA has the plus or minus 0 potential. Upon arrival of a pulse equivalent to the U-potential at the input of the counter E1 the potential —U is applied to E1, the marking potential —U is removed from the input $\overline{E1}$ and the voltage +0 is applied instead. However, the potential is not changed at the output SA, because the input $\overline{C}$ there is still applied the potential ±0 through conductor 43 to output SA. On account of its marking potential —U the input E1 provides an access for the control voltage —U, via the resistor R2, to the output RA, because also the flip-flop stage FFC is still in the state "L," and the input C of the translator is marked. The flip-flop stage FFA is reversed, as may also be taken from the Table II. This new state, however, corresponds to the stable intermediate position (2) of the counting circuit. The newly appearing marking potential at the input $\overline{A}$ of the translator prepares the resetting of the flip-flop stage FFB to the state "L." The resetting is prevented from being performed as long as the pulse is applied ($\overline{E}1$—voltage±0). The flip-flop stage FFC remains in the state "L," because the voltage (potential) ±0 acts upon the output RC via the input B. However, upon disconnecting the pulse, the input voltages at E1 and $\overline{E1}$ are changed. The flip-flop stage FFB is brought to the state "L" because the control voltage —U which is applied via a resistor R3, is capable of gripping through to the output SB, that is the input SB of the flip-flop stage FFB. The reversal of the flip-flop stage FFC to the state "0" is suppressed now as before, by the input E1, the control voltage is prevented from passing through to the output RC. The flip-flop stage FFA remains in its state "0," because the control via SA is prevented from being performed via the input C. In this way the counting circuit has reached the stable counting position (3). During the next pulse, and via the intermediate position (3), the counting circuit is again returned to normal, that is, to its counting position (1).

Figure 5:
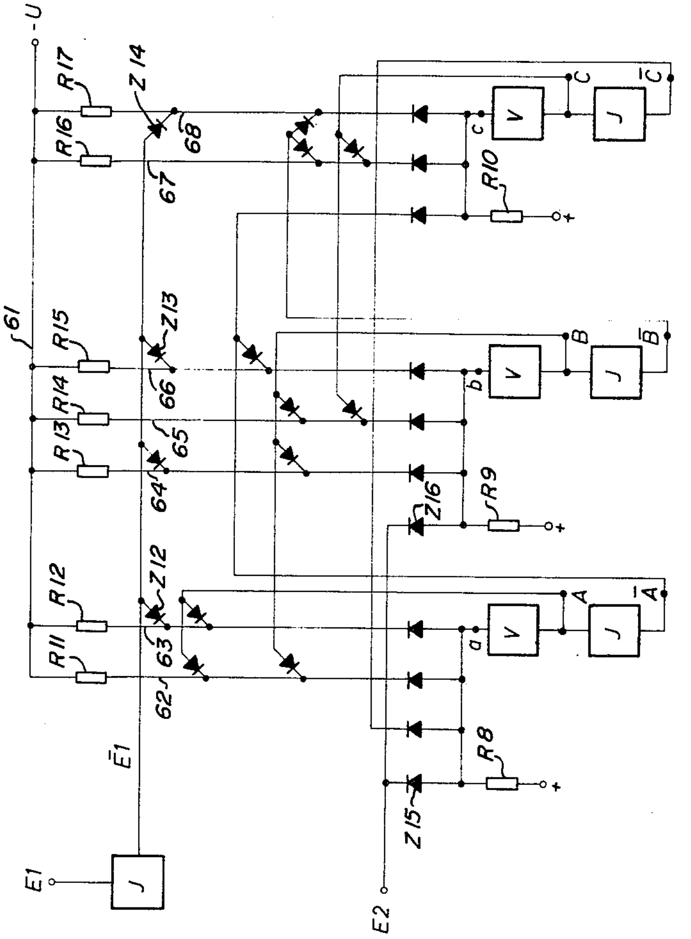

FIG. 5 shows a counter comprising $n=3$ counting positions, adapted to remain in its final position. That is, the control will remain in its counting position (3) until being reset, via the special input E2, to its normal position, in other words, to its counting position (1). As a modification of what is shown e.g. in FIG. 4, the voltage is now tapped at the outputs ($a$, $b$, $c$) of the translator, and is fed back respectively via an amplifier V without phase shift, and via an inverter stage J, to the inputs (A, B, C and $\overline{A}$, $\overline{B}$, $\overline{C}$). Accordingly, the output information of the translator is available both directly and in a complementary form. When choosing the same counting and intermediate positions for the counting circuit as shown in FIG. 4, then, the counter of FIG. 5, will provide a sequence of functions which will be in accordance with the following Table III:

*Table III*

| a b c | E1="0" | E1="L" |
|---|---|---|
| 0 0 0 | | |
| 0 0 L | 0 L L | (2) 0 0 L |
| 0 L 0 | | |
| 0 L L | (3) 0 L L | 0 L L |
| L 0 0 | L 0 L | (1) L 0 0 |
| L 0 L | (2) L 0 L | 0 0 L |
| L L 0 | (1) L L 0 | L 0 0 |
| L L L | (r) L L 0 | (r) L L 0 |

From this table there will again result the following logical functions with respect to the translator:

$$a=A\cdot B+A\cdot\overline{E1}+\overline{C}+E2$$
$$b=B\cdot\overline{E1}+B\cdot C+\overline{A}\cdot\overline{E1}+E2$$
$$c=\overline{B}\cdot\overline{E1}+B\cdot\overline{C}+\overline{A}$$

As may be recognized from the logical functions, the actual input signal is only required in a complementary form via the inverter stage J at the input $\overline{E1}$. The equations are to be read as follows:

The output $a$ is marked from potential U through bus 61, resistor R12 whenever either the inputs A and B, or the inputs A and $\overline{E1}$, or the inputs $\overline{C}$ or E2 are marked. It should be noted that the control or marking potential —U is applied through the common bus 61 to a bank of 7 resistors R11–R17. The current input is transmitted to the outputs $a$, $b$ and $c$ through common conductor 60 and diodes Z12, Z13, Z14 and conductors 63, 66 and 68 respectively. Furthermore it is shown in the table that the counter is capable of assuming three counting and two intermediate positions. For example, once the counting position (3) has been reached, the state of the counting circuit will no longer be changed upon application of further pulses to the input E1. The outputs $b$ and $c$ will remain to be marked by the voltage (potential) —U, and the voltage ±0 is applied to the output $a$. Independently of the voltage applied to the input E1, this state will remain, because $a$ could only be changed via the input E2, and because the voltage applied to $b$ could only be changed by a variation at $a$ or $c$ respectively, and because $c$, in turn, is again dependent upon a change effected at the output $b$.

When applying the voltage —U to the input E2, the output voltage at $a$ will be changed, by the passage of the —U potential through diode Z15. This diode is properly biased from a positive potential through resistor R8. As long as this resetting voltage is applied, the voltage —U will be effective not only at *a*, but also at *b* through diode Z16 properly biased from the positive potential through resistor R9. However, this means to imply that the voltage at the output *c* is brought to the value ±0 from input B. This state which is indicated by the letter *r* in the table is assumed independently of the state of the input line E1, and already corresponds to the output voltage, that is, to the counting position (1) of the counter. Upon disconnecting the resetting voltage just the moment that no counting pulse is applied, the output information will remain, because no change of the circuit condition is effected via $\overline{E1}$. However, if a counting pulse has already been applied, then the counting circuit will be shifted to the intermediate position (1), as may be taken from the table. Relative thereto it is still to be noted that the counter may be reset from any suitable position.

The counting circuit according to the present invention is in no way restricted to the examples described hereinbefore, in fact may be extended to any suitable number of binary positions and to any suitable counting codes. While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A counting circuit comprising translator means, said translator means consisting of a network of resistors and diodes and having translator input means comprising a pair of input conductors for receiving input counting information, translator output means for providing output counting information, said network comprising a plurality of conductor pairs arranged in sequence, said diode means connected to couple each of said input conductors to alternate ones of said conductor pairs, battery means, said network resistors used for coupling each of said conductors of each of said conductor pairs to said battery means through one of said resistors, counting circuit input means comprising inverter means operated responsive to the receipt of input information at said counting circuit for transmitting said input information to one of each of said plurality of conductor pairs and for transmitting the inverse of said information to the other of said plurality of conductor pairs at the junction of said conductors and said resistors, a plurality of amplifier circuits, a plurality of second inverter circuits, means for connecting the inputs of each amplifier circuit of said plurality of amplifier circuits to each of said translator outputs for operating each of said amplifier circuits responsive to the receipt of said input information, means for connecting the outputs of each of said amplifier circuits to the input of an associated one of said plurality of second inverter circuits, means for connecting the outputs of each of said inverter circuits to the input conductor pairs of the succeeding one of said plurality of conductor pairs, and diode means in the said last named connecting means operated responsive to the operation of any one of said second inverter circuits to operate the amplifier and inverter circuit connected to said succeeding conductor pair until said output information is equivalent to said translator input information.

2. A counting circuit comprising translator means, said translator means consisting of a network of resistors and diodes and having translator input means comprising a pair of input conductors for receiving input counting information, translator output means for providing output counting information, said network comprising a plurality of conductor pairs arranged in sequence, said diode means connected to couple each of said input conductors to alternate ones of said conductor pairs, battery means, said network resistors used for coupling each of said conductors of each of said conductor pairs to said battery means through one of said resistors, counting circuit input means comprising inverter means operated responsive to the receipt of input information at said counting circuit for transmitting said input information to one of each of said plurality of conductor pairs and for transmitting the inverse of said information to the other of said plurality of conductor pairs at the junction of said conductors and said resistors, a plurality of flip-flop circuits, means for connecting the inputs of each flip-flop circuit of said plurality of flip-flop circuits to each of said translator outputs for operating each of said flip-flop circuits responsive to the receipt of said input information, means for connecting the outputs of each of said flip-flop circuits to the input conductor pairs of the succeeding one of said plurality of conductor pairs, and diode means in the said last named connecting means operated responsive to the operation of any one of said flip-flop circuits to operate the flip-flop circuit connected to said succeeding conductor pair until said output information is equivalent to said translator input information.

References Cited by the Examiner

UNITED STATES PATENTS

| | | | |
|---|---|---|---|
| 2,806,947 | 9/57 | MacKnight | 235—92 |
| 2,816,223 | 12/57 | Nelson | 235—92 |
| 2,853,238 | 9/58 | Johnson | 235—92 |
| 2,912,578 | 11/59 | Van Duuren et al. | 328—52 |
| 2,962,212 | 3/60 | Schneider | 235—92 |
| 2,964,657 | 12/60 | Page | 307—88.5 |
| 2,997,233 | 8/61 | Selmer | 235—92 |
| 3,060,328 | 10/62 | McMillian | 328—42 |
| 3,076,956 | 2/63 | Hogan et al. | 340—172.5 |

OTHER REFERENCES

Page 51, March 1961, I.B.M. Technical Disclosure Bulletin, volume 3, No. 10.

MALCOLM A. MORRISON, *Primary Examiner.*